United States Patent [19]

Redfern et al.

[11] 4,330,855

[45] May 18, 1982

[54] APPARATUS FOR MULTIPLEXING DIGITAL SIGNALS

[75] Inventors: John T. Redfern, La Jolla; Gary A. Dressel, San Diego, both of Calif.

[73] Assignee: The United States of America as represented by the Secretary of the Navy, Washington, D.C.

[21] Appl. No.: 126,588

[22] Filed: Mar. 3, 1980

[51] Int. Cl.³ .............................................. H04J 3/06

[52] U.S. Cl. ....................................... 370/100; 370/85

[58] Field of Search .................. 370/100, 85; 340/566, 340/512, 517

[56] References Cited

U.S. PATENT DOCUMENTS

| | | | |
|---|---|---|---|
| 3,990,036 | 11/1976 | Savit | 370/85 X |
| 4,053,714 | 10/1977 | Long | 370/100 |
| 4,097,692 | 6/1978 | Felix | 370/100 X |
| 4,149,144 | 4/1979 | Diefenderfer | 370/85 X |
| 4,229,792 | 10/1980 | Jensen et al. | 364/200 |
| 4,241,444 | 12/1980 | Kister | 370/85 |

*Primary Examiner*—Thomas W. Brown

*Attorney, Agent, or Firm*—Robert F. Beers; Ervin F. Johnston; Terrance A. Meador

[57] ABSTRACT

The invention is an apparatus and method for multiplexing digital information acquired from a multiplicity of data terminals distributed along a conductor of given length. A cyclic synchronization signal consisting of a stream of coding periods is transmitted upon the conductor. The duration of each coding period exceeds the two way travel time through the conductor. The leading edge of a coding period stimulates the transmission of one bit of a digital word stored in each terminal. The bits from the terminals arrive at a system receiver in a time sequence corresponding to the spatial distribution of the terminals. Bits are collected in storage registers according to their significance which is determined by the respective coding period during which they are received. A word from a particular terminal is derived by strobing the output of the storage registers at the time corresponding to the position of the terminal.

9 Claims, 6 Drawing Figures

APPARATUS FOR MULTIPLEXING DIGITAL SIGNALS

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The invention disclosed and claimed herein pertains to the field of digital electronics systems. More particularly, the invention pertains to digital systems within which information is transferred in a time-division multiplexed format. More particularly still, the invention pertains to such systems within which time domain multiplexed information is transferred between equipments upon a common conduction path, commonly called a data bus.

A useful technique of transmitting digital information between the units of a digital electronic system involves the use of a single, common transmission line called a data bus. Access to the bus for purposes of transmission is a feature of the system control mechanism which governs use of the bus. Many system control mechanism utilize time-domain multiplexing to allocate transmission access time.

Time-domain multiplexing refers to the designation of discrete, coherent time slots for use as communication channels. This technique is applied to data bus transmission by allowing a respective system unit access to the bus during an allocated time slot.

Demultiplexing of information which is transmitted on the bus is accomplished by observing the transmission on the bus during the time slot of interest.

Such data bus multiplexing techniques assign time slots on a complete word or message basis. Control over assignment of and access to the time slots requires a sophisticated level of system control. Control may be lodged in a centralized system controller, or shared between a less sophisticated controller and data bus users.

The sophisticated data bus control techniques of the prior art require additional system hardware and software to process the control information. Bus data transmission efficiency, the portion of transmission time devoted to movement of data, is reduced by the dedication of separate transmission time slots for control information traffic alone. On a system basis, cost per data unit transmitted is directly related to dedicated elements and to bus transmission efficiency. Hence, minimization of control equipment and maximization of efficiency are mandatory for low cost data transfer.

SUMMARY OF THE INVENTION

The present invention provides an inexpensive apparatus and a simple method for multiplexing digital signals which are obtained from a collection of spatially sequenced data terminals attached to a single, common conducting cable. By employing a cyclic synchronization signal comprised of a serial stream of equal coding periods, each of said coding periods consisting of one cycle of a periodic waveform, and each of said coding periods exceeding in duration the time required for a signal to be propagated through twice the length of the conducting means, and by constraining the duration of each of the data signals to be relatively less than a coding period, the invention is capable of providing an efficient method for multiplexing digital data in which control and data signals are simultaneously transmitted upon the same conducting path. Since data transmission is continuous, transfer efficiency is maximized.

The invention is usefully embodied in an apparatus comprising a conducting cable having two ends and a given length, the apparatus further comprising a receiver for selectively receiving the digital signals, the receiver being connected to one end of the conducting cable. A transmitter for transmitting the aforementioned synchronization signal is connected to the sme end of the conducting cable as the receiver. A plurality of data terminals are connected to the conducting cable in a spaced sequence, and each of the terminals responds to the synchronization signal by immediately transmitting a digital signal upon the conducting cable. The duration of each digital signal is relatively less than the duration of a coding period. A system synchronizer is connected between the transmitter and the receiver for providing the synchronization signal to the transmitter, and for providing timing and control signals to the receiver. These features combine to allow the receiver to detect a serial stream of digital signals during a coding period in a time sequence corresponding to the spaced sequence of the data terminals. Since the system control mechanization consists entirely of timing and control circuitry located in the system synchronizer, simply constructed, the above-described multiplexing technique can be implemented with a minimum of simple, dedicated control equipment.

OBJECTS OF THE INVENTION

An object of the invention is to provide a new and improved method and apparatus for substantially increasing the transmission efficiency of a digital system employing a single, common conducting path for transmission of digital data.

A further object of the invention is to provide a simplified control method useful in the transmission of multiplex digital data.

Yet another object of this invention is to provide an improved method for multiplexing digital signals by which multiplexing control signals and multiplexed digital signals are transmitted simultaneously upon a common conduction path.

A further object of this invention is to provide a multiplexing apparatus in which system transmission and remote terminal power are conducted simultaneously upon a common conduction path.

Still a further object of this invention is to provide an improved method and apparatus for transmission of multiplexed digital data in systems employing a multiplicity of spatially distributed data sources.

A still further object of this invention is to provide a time-division multiplexing method for use in a digital data transmission system which results in high transmission efficiency and modest control requirements.

These and other objects of the invention will become readily apparent from the ensuing description when taken together with the drawings.

DESCRIPTION OF THE PREFERRED EMBODIMENT

Figure 1:
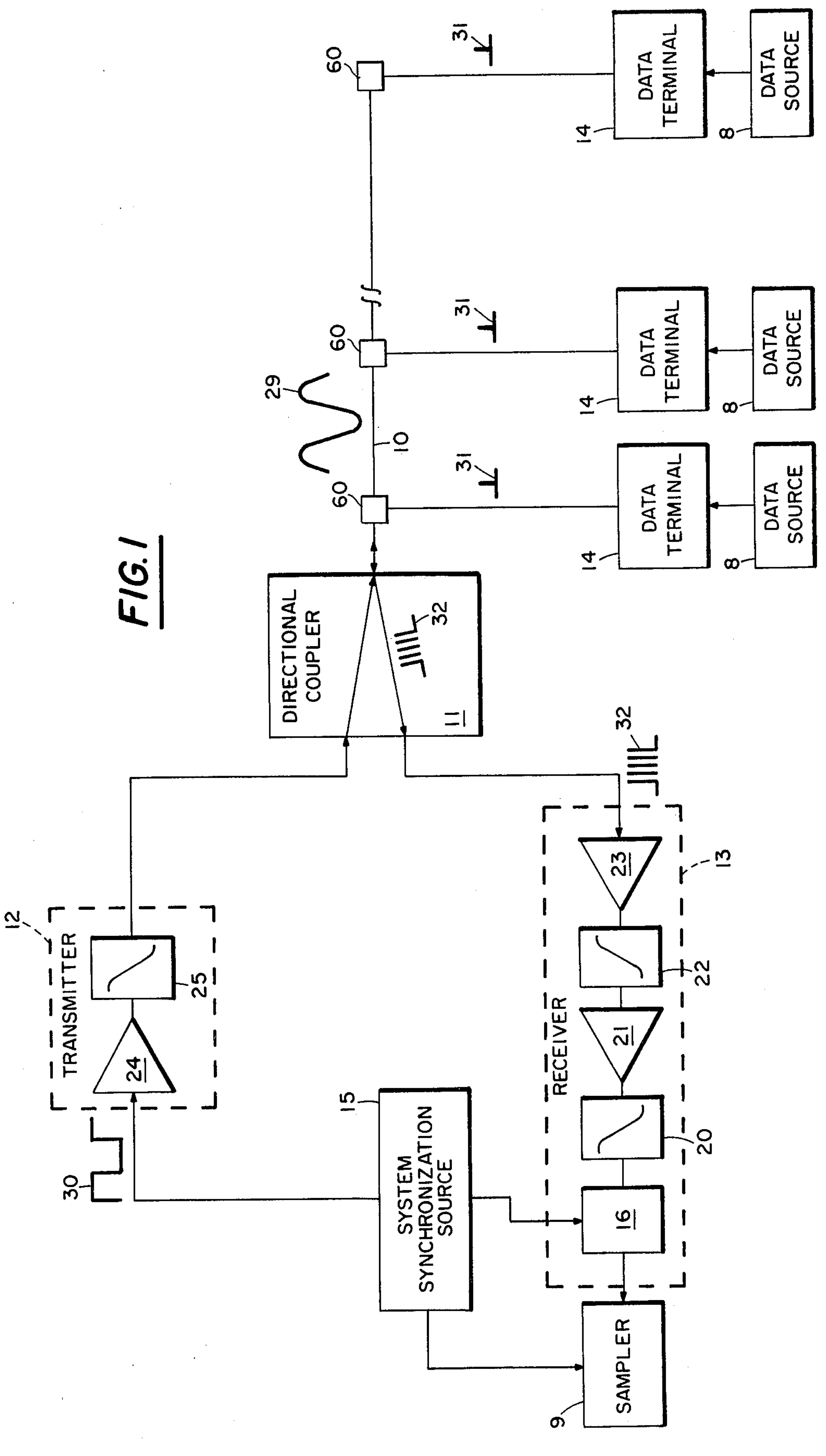
FIG. 1 shows a block diagram of an embodiment of the invention.

Referring to FIG. 1, there is shown a block diagram of a digital system in which a number of data terminals 14 distributed in a spaced sequence are connected to a single, common conduction path 10. Conduction path, having a given length and two ends, provides a communications highway between the data terminals 14 and system control equipment, including a transmitter 12, and a receiver 13. System synchronization source 15 controls and coordinates the operations of transmitter 12, receiver 13, and word sampler 9. Directional coupler 11, coupled to one end of conduction path 10, provides access to conduction path 10 for system transmitter 12 and system receiver 13. Data sources 8 provide analog signals which are converted to serial digital words in data terminals 14 for transmission upon conduction path 10.

In applications of the embodiment, the physical location of data terminals 14 can have significance. For example, a data source 8 can be a seismic transducer monitoring a particular geographical sector in a perimeter of interest. Alternatively, data source 8 can be a sensor located at a control point in a manufacturing production sequence. In both cases, the locations of data sources 8 relative to each other impart a spatial significance to the analog signals converted and stored in data terminals 14. To preserve the spatial significance, data terminals 14 are connected to conduction path 10 in the same sequence assumed by data sources 8. The invention teaches a method to preserve that sequence when the data are multiplexed for transmission on conduction path 10.

Figure 2:
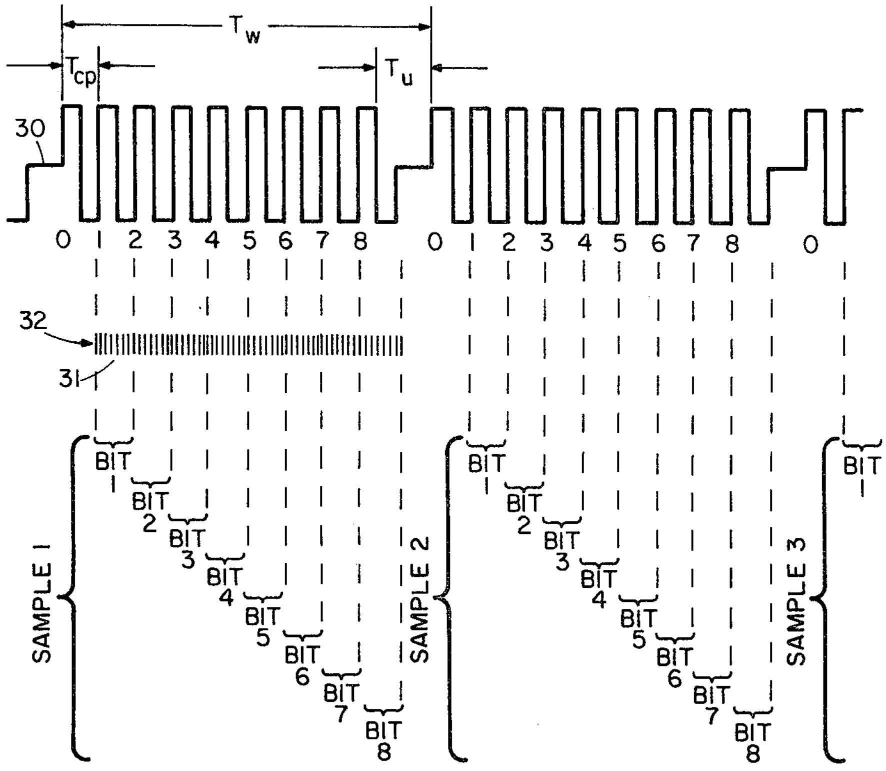
FIG. 2 is a graphical representation of waveforms which is useful for understanding the operation of FIG. 1.

With reference to FIG. 1 and FIG. 2, control of data modules 14 resides in a synchronization signal 30 transmitted by system transmitter 12. Synchronization signal 30 is a composite waveform comprising a stream of coding periods which is periodically interrupted by an update period. The duration of a coding period, $T_{cp}$, exceeds the time required for any signal to propagate from one end of conduction path 10 to the other end and then from the other end back again to the first end. A coding period is divided into two equal halves, with the beginning of each half indicated by a change in state. As an edge of the first half of a coding period cycle passes a data terminal 14, one data bit 31 of a stored digital word is placed on the conduction path 10 by that terminal 14. Data bits 31 from successive data terminals 14 arrive at the directional coupler 11 separated by the two way transmission time between adjacent data terminals 14.

The repetition rate of data bits 31 is determined by the number of data terminals 14 serviced, size of the digital words stored in data terminals 14, and the update rate of the words stored in data terminals 14.

The repetition rate of data bits 31 is constrained to be the inverse of the two-way transmission time along the shortest segment of conduction path 10 between the data terminal couplers 60 of two adjacent data terminals 14.

In the preferred embodiment, one hundred data terminals 14 are connected to conduction path 10, and each stores an eight-bit digital word which is a sample of an analog waveform supplied by a data source 8. Sample update rate is 1000 times per second. This results in a repetition rate of 800,000 bits per second. The minimum spacing between adjacent terminal couplers 60 must be such to ensure that the two-way conduction time between them exceeds the reciprocal of the duration of a data bit 31, i.e. 1.25 microseconds.

In FIG. 2, composite waveform 32 represents the data bits 31 as they arrive at directional coupler 11 and are sensed by receiver 13. The time position of a data bit 31 within composite waveform 32 has dual significance. Within a coding period, data bits 31 arrive in a time sequence corresponding to the spatial sequence of data terminals 14. The coding period during which data bits 31 arrive indicates the magnitude significance of data bits 31 contained within it; all data bits 31 arriving within the same coding period have equal magnitude significance.

In FIG. 2, the basic pattern of synchronization signal 30 is shown for the preferred embodiment illustrated in FIG. 1. The fundamental cycle of synchronization signal 30 consists of nine coding periods followed by one missing coding period. The interval during which the missing period would have occurred is designated as the update period, $T_u$. The missing period is sensed by each data terminal 14 following which the stored digital word is updated. The first coding period in each cycle of synchronization signal 30 allows the voltage on conduction path 10 to settle and is ignored by all data terminals 14. The next eight coding periods cause each data terminal 14 to output eight data bits 31, which comprise the stored digital word, at the rate of one bit per coding period. Each cycle of synchronization signal 30 is designated as a word frame, Tw. In the preferred embodiment, the coding period repetition rate is 10,000 per second and the word cycle repetition rate is 1000 per second.

Wide variations in the configuration of the invention contained in FIG. 1 are possible as are modifications of the technique pictured in FIG. 2. For example, synchronization signal 30 and data bits 31 can be routed on separate cables. Differing word sizes can be realized by changing the number of coding periods contained in a cycle of synchronization signal 30, or by using fractions or multiples of the cycle of synchronization signal 30. Synchronization signal 30 can be a unipolar or sinusoidal waveform.

Referring once more to FIG. 1, detailed system operation can be understood. Transmitter 12 accepts synchronization signal 30 from synchronization source 15 for transmission upon conduction path 10. When synchronization signal 30 is presented to transmitter 12, it is connected to the input of transmitter amplifier 24 and directed from the output thereof to the input of low pass filter 25 to reduce interferring harmonics and then to drive conduction path 10 through directional coupler 11.

Directional coupler 11 is effectively coupled between the output of transmitter 12 and one end of conduction path 10, and between the same end of conduction path 10 and the input of receiver 13. Directional coupler 11 directs synchronization signal 30 onto conduction path 10 while blocking it from entering the input of receiver 13, and separates data pulses 31 arriving on conduction path 10 from synchronization signal 30 and directs these to the input of receiver 13.

Conduction path 10 can be selected from transmission cables which are well known in the art. The choice will be determined by system operation requirements of data rate and system length, and by price. It is readily apparent that conduction path 10 can be selected from the class of metallic conductors as well as the class of dielectric conductors which includes fiber optics.

The characteristics of directional coupler 11 are a matter of design choice, depending upon the terminal characteristics of transmitter 12 and receiver 13, the characteristic impedance of conduction path 10, and the characteristics of the signals to be transmitted thereon.

Figure 3A:
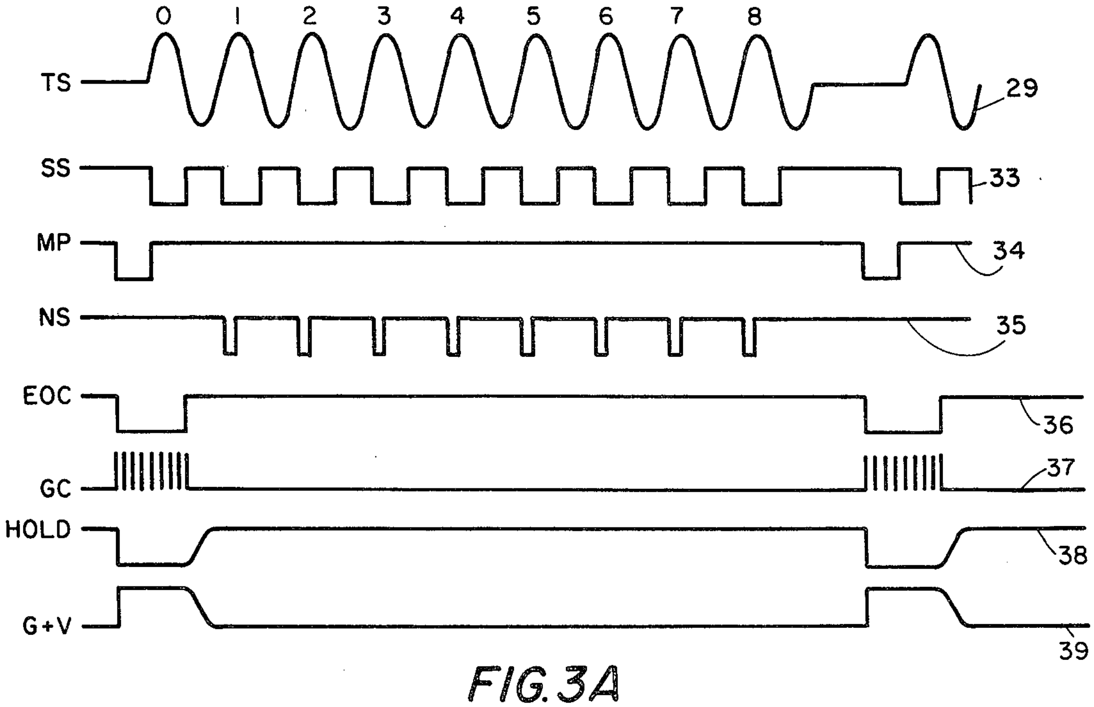
FIG. 3A is a graphical representation of waveforms which is useful for understanding the operation of FIG. 3.
Figure 3:
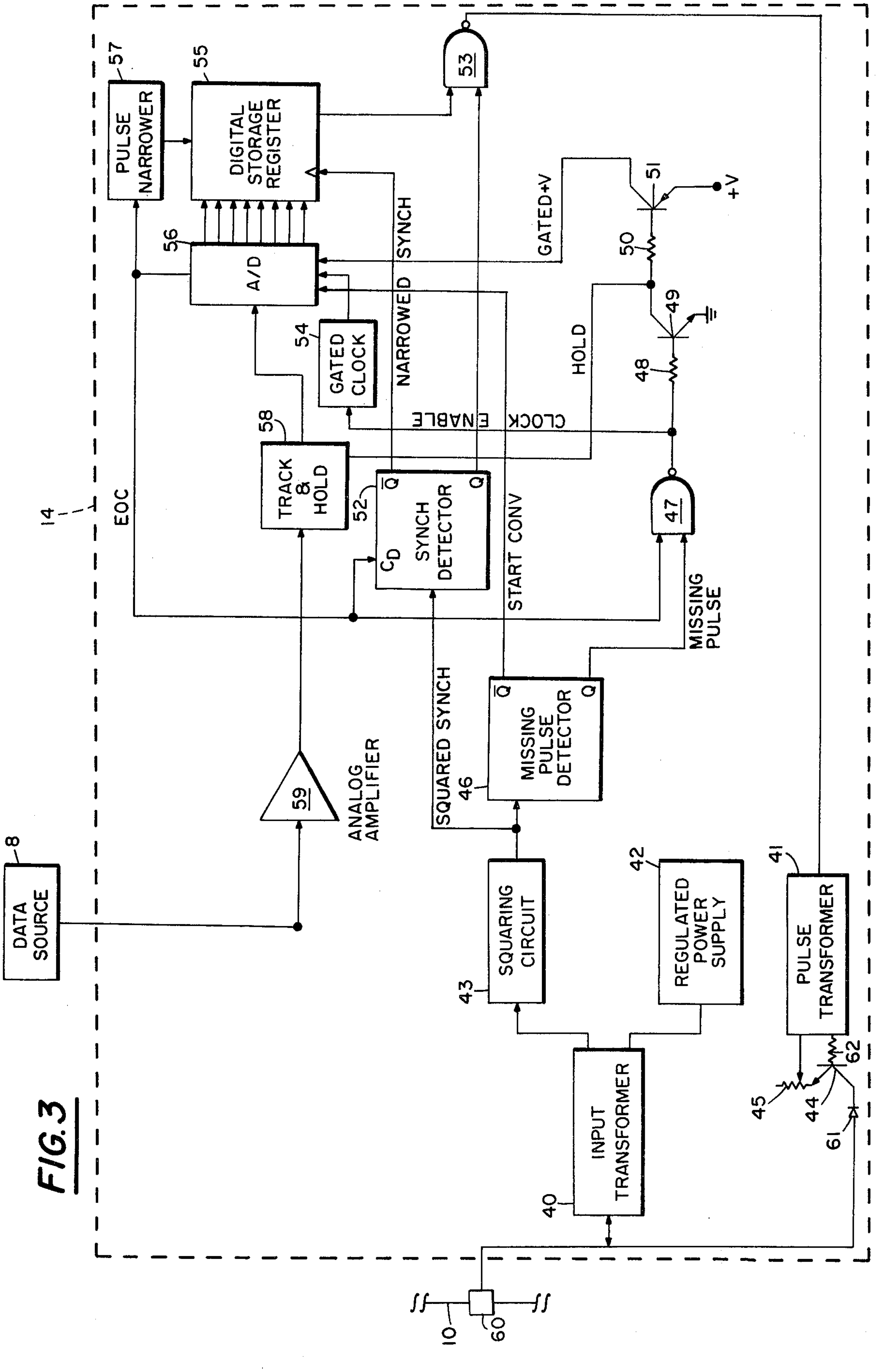
FIG. 3 is a functional diagram of a data terminal for use in the embodiment of FIG. 1.

With reference to FIG. 3, there is shown a schematic representation of a data terminal 14. Data terminal 14 is connected to conduction path 10 by terminal coupler 60. Input transformer 40 couples signal power from conduction path 10 to the input of regulated power supply 42, and to squaring circuitry 43 which is the input of the terminal control circuit. Input transformer 40 can be of any commercially available variety with a tapable primary coil and two secondary coils. The primary coil of input transformer 40 is tapped to adjust for the variation in the amplitude of power on conduction path 10 caused by increasing distance from transmitter 12. This is a necessary feature if regulated power supply 42 is to derive power for terminal operation from signal power on conduction path 10. If powered from transmitted synchronization signal 29, power supply 42 can comprise, for example, a full wave rectifier and a self-starting regulator.

Control and performance of the operations of data terminal 14 can be understood by referring to FIG. 3 and FIG. 3A. The synchronization signal is connected to the input of squaring circuit 43 from a second secondary winding of input transformer 40. At this point, transmitted synchronization signal 29 can have the highly filtered shape shown in FIG. 3A. Squaring circuit 43, which can comprise a buffered Schmitt trigger, reshapes the transmitted synchronization signal 29 to squared synchronization signal 33. Missing pulse detector 46 accepts the squared synchronization signal 33 to search for the missing coding pulse. A retriggerable one shot can be utilized for this purpose by causing its pulse width to be greater than the duration of the coding period. Discovery of the missing coding period causes missing pulse detector 46 to produce a missing pulse signal, waveform 34, at its Q output. The inverse of waveform 34 appears at the $\overline{Q}$ output of detector 46. Squared synchronization signal 33 is also applied to the input of sync detector 52 where it is narrowed to equal the duration of data pulses 31 as shown in waveform 35 of FIG. 3A. Analog-to-digital converter 56, described in detail hereinbelow, generates an end-of-conversion signal (EOC), waveform 36, which is combined with the Q output of missing pulse detector 46 at NAND gate 47 to produce a control signal for conversion functions described hereinbelow.

Data source 8 provides an analog signal of interest to data terminal 14 through the input of analog amplifier 59. The operation of analog amplifier 59 can be supplemented by filtering to enhance the quality of the analog signals within the bandwidth of interest. Track-and-hold circuit 58 tracks the output of analog amplifier 59 until a missing pulse is detected.

When the missing pulse is detected, the Q output of missing pulse detector 46 drops, causing the output of NAND gate 47 to rise. The output of NAND gate 47 is connected to the input of a power gate comprising resistors 48 and 50 and transistors 49 and 51. When the output of NAND gate 47 rises, a bias is developed across resistor 48 which turns on transistor 49, in turn developing a bias across resistor 50 which turns on transistor 51. The collector voltage of transistor 49, connected to track-and-hold circuit 58, disables the tracking circuit and causes the current value of the analog signal provided by analog amplifier 59 to be held. Waveform 38 represents the collector voltage of transistor 49.

Track-and-hold circuit 58 provides the currently held value of the input analog signal to the input of analog-to-digital converter 56. At the same time that track-and-hold circuit 58 holds a sample of the analog signal, the rising output of NAND gate 47 causes gated clock 54 to provide a clock to analog-to-digital converter 56 for activation of internal circuitry. At this time, transistor 51, which has been turned on concurrently with transistor 49, provides voltage, represented by waveform 39, to analog-to-digital converter 56. In addition, the $\overline{Q}$ output of missing pulse detector 46 furnishes a start conversion signal to analog-to-digital converter 56 to which it is effectively connected. Analog-to-digital converter 56 is selected to have a conversion cycle which does not exceed the duration of a coding period. This ensures that conversion and associated functions can be completed within the duration of the update period.

The end-of-conversion signal, waveform 36, available as an output of analog-to-digital converter 56, rises when conversion is completed and remains high until analog-to-digital converter 56 senses the next start conversion command from the $\overline{Q}$ output of missing pulse detector 46. As explained hereinabove, waveform 36 is combined with the Q output of missing pulse detector 46 at NAND gate 47. This allows the gated clock 54 to commence operation simultaneously with the arrival of the start conversion command at converter 56. By making the change of state of missing pulse detector 46 shorter than the conversion period of analog-to-digital converter 56, the shut down of conversion-related activities and the recommencement of sampling can be effectively controlled by the end-of-conversion signal, waveform 36.

Analog-to-digital converter 56 can be selected from any commercially available device having the operational characteristics required by system design. For the preferred embodiment a representative analog-to-digital converter is the MN5065 device manufactured by Micro Networks Corporation, Worcester, Mass.

The digital output of analog-to-digital converter 56 is connected to the input of digital storage register 55. At the end of conversion, waveform 36 causes pulse narrower 57 (which can comprise a Schmitt trigger in conjunction with a NAND gate) to generate a pulse commanding digital storage register to load the output of analog-to-digital converter 56. At the same time, waveform 35, derived from waveform 33 and available at the $\overline{Q}$ output of sync detector 52, acts as a clock and causes the digital information stored in digital storage register 55 to be read out at the rate of one bit per coding period. Sync detector 52 is inhibited in the first coding period by the end-of-coding signal, waveform 36, which prevents digital storage register 55 from reading out its first bit until the second coding period of transmitted synchronization signal 29 is detected.

The data are clocked out of digital storage register 55 in the sequence most significant bit (MSB) first through least significant bit (LSB) last. The Q output of sync detector 52 is combined with the data coming from digital storage register 55 at NAND gate 53 to narrow the width of the bits clocked out of digital storage register 55 to the width required for data pulses 31.

The narrow pulses output from NAND gate 53 are connected to the primary coil of pulse transformer 41. The secondary coil of pulse transformer 41 is connected across a variable amplitude current sink, comprising variable resistor 45, transistor 44, biasing resistor 62 and reverse voltage limiting diode 61. The data pulse is effectively connected from the collector of transistor 44 onto conduction path 10 as a negative current pulse by means of data terminal coupler 60.

Data terminal coupler 60 directs a portion of the energy contained in signal traffic being transmitted upon conduction path 10 into a data terminal 14. The remainder of the energy passes through terminal coupler 60 to be conducted to the downstream data terminals attached to conduction path 10. At the same time, terminal coupler 60 allows data bits 31 to be connected or otherwise directed from data terminal 14 onto conduction path 10. The performance characteristics of data terminal coupler 60 are determined by the selection of cable for conduction path 10 according to transmission design techniques which are well known in the art.

It is obvious that the design of a data terminal 14 can be modified to accommodate the requirements of differing applications. For example, data source 8 can supply digital information directly to storage register 55, eliminating the need for all analog buffering and conversion circuitry within data terminal 14. Regulated power supply 42 can be disconnected from transformer 40 and connected to an AC power source proximate to data terminal 14. Regulated power supply 42 can also be powered by storage batteries, or by a DC power source external to data terminal 14.

With reference again to FIG. 1 and FIG. 2, directional coupler 11 separates returning data pulses 31 from synchronization signal 30 and supplies these to system receiver 13. An output connection point of directional coupler 11 is effectively coupled to the input of receiver wideband amplifier 23 where the incoming stream of data pulses 31, represented by waveform 32, is initially amplified and applied to the input of high pass equalizer 22. High pass equalizer 22 reduces pulse spreading and applies the stream of equalized data pulses 32 to the input of receiver wideband amplifier 21. From receiver wideband amplifier 21, input data pulse stream 32 is directed through low-pass band limiting filter 20 to the input of system receiver storage section 16, more fully illustrated in FIG. 4 and explained hereinbelow. From system receiver storage section 16, reformatted data pulses 31 are directed to word sampler 9 for reconstruction of data words stored in data terminals 14.

The input stream of data pulses 32 represents the multiplexed output of all data terminals 14. It comprises all data bits 31 transmitted by data terminals 14 in response to synchronization signal 30. Demultiplexing data stream 32 is accomplished by framing it with outgoing synchronization signal 30.

During each of eight coding periods, one hundred data terminals 14 transmit one bit each. During a cycle of synchronization signal 30, eight hundred bits, one hundred per coding period, are transmitted to system receiver 13. During the first coding period and the update period, no bits 31 are transmitted. Framing the incoming data stream 32 with the outgoing synchronization signal 30 will allow separation of each group of eight hundred data bits 31 into eight subgroups of one hundred bits each. The first subgroup will comprise the MSBs of the digital words stored in data terminals 14, and so on down to the last subgroup which will comprise the LSBs.

Since the incoming data stream and the outgoing synchronization signal 30 are transmitted virtually simultaneously, the incoming data stream 32 can be framed for demultiplexing by the addition of counting and phasing circuitry to the same circuitry which produces synchronization signal 30.

Figure 4:
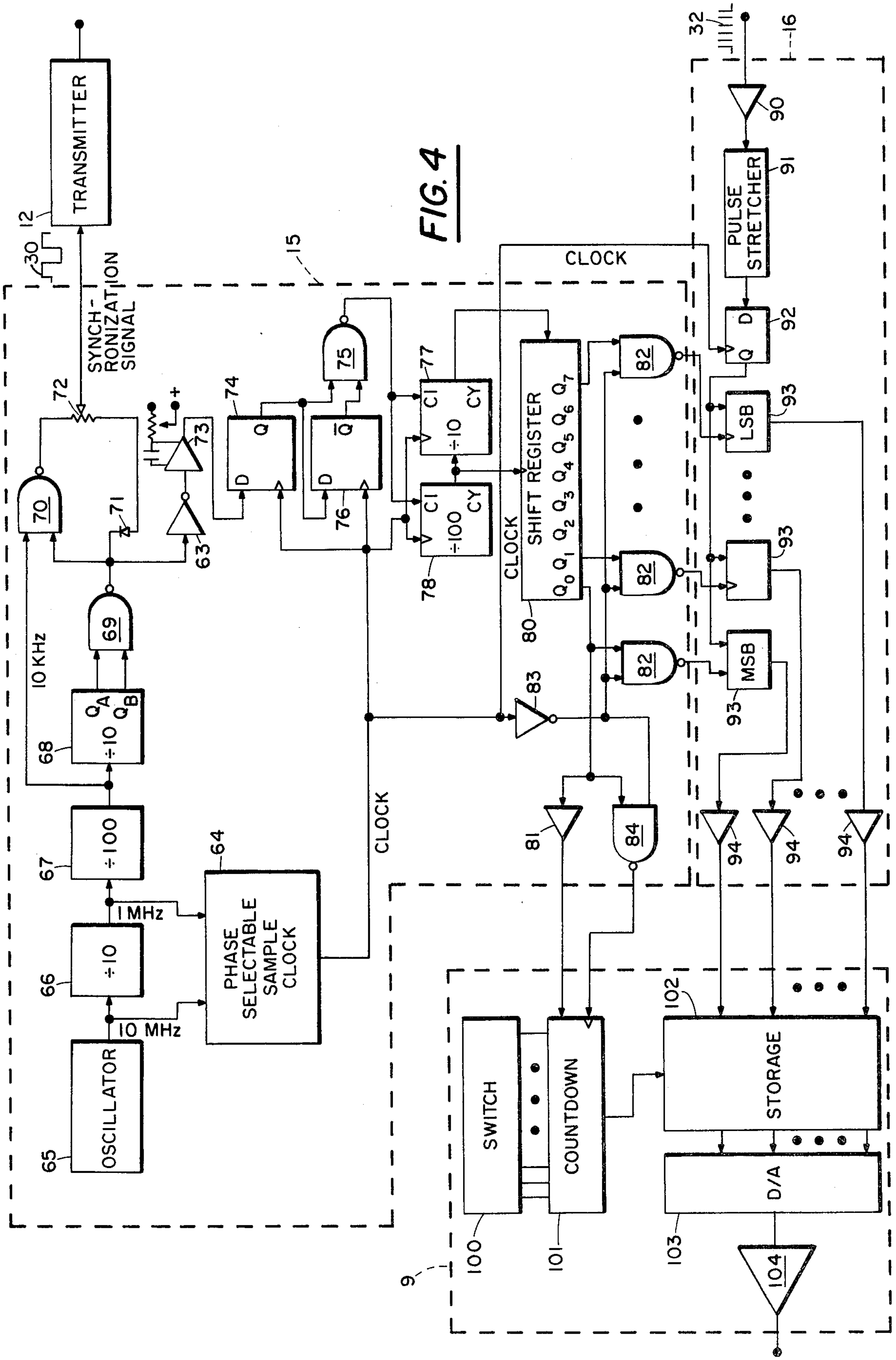
FIG. 4 is a logical diagram of system synchronization circuitry, receiver storage circuitry, and word sampling circuitry for use in the embodiment of FIG. 1.
Figure 4A:
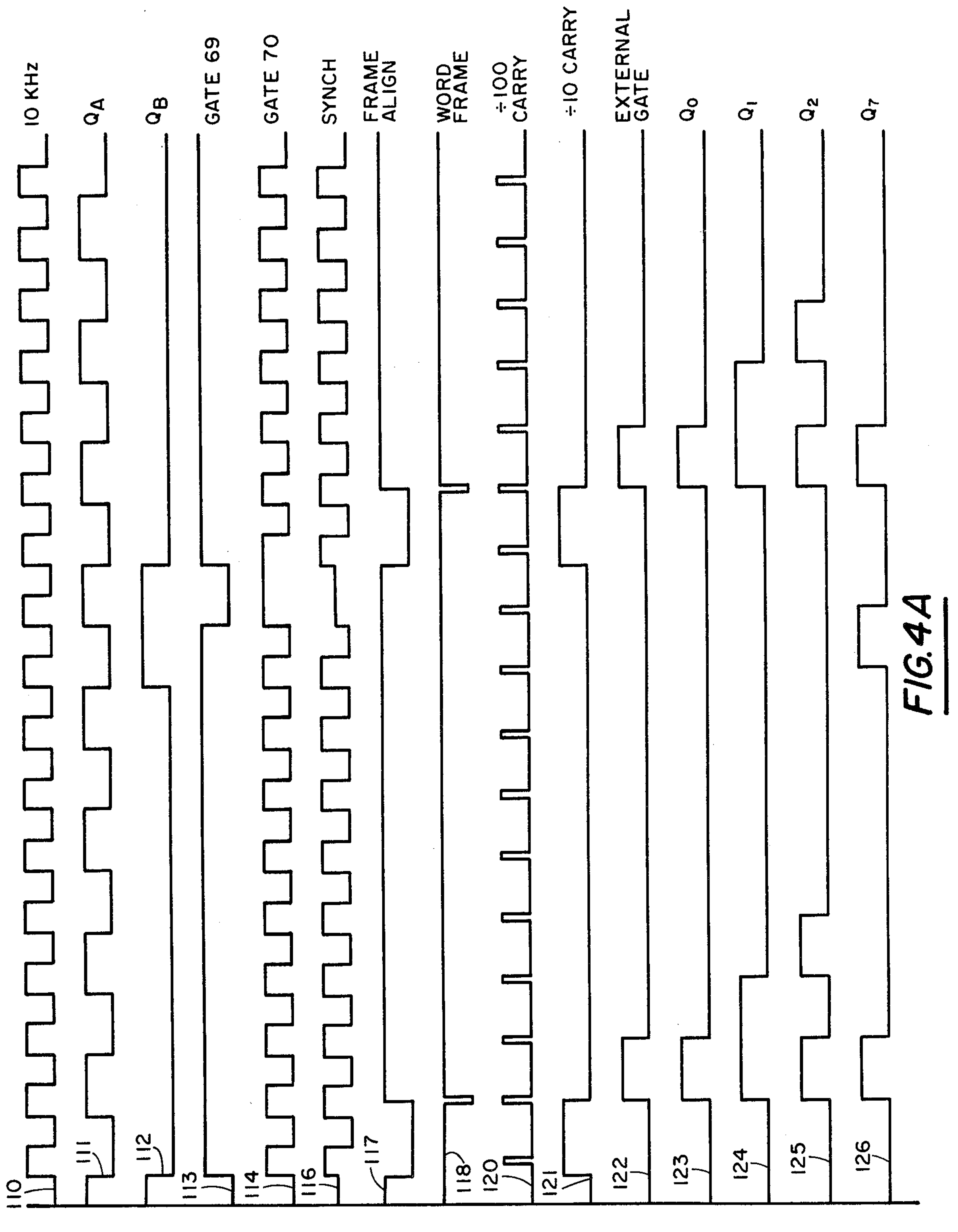
FIG. 4A is a graphical representation of waveforms which is useful for understanding the operation of FIG. 4.

With reference now to FIGS. 4 and 4A, the techniques of framing and demultiplexing as practiced in the invention will be obvious. System timing and control are derived from crystal oscillator 65. The output of crystal oscillator 65 is directed to two different divide down chains. One chain is fixed in phase and provides the drive for synchronization signal 30 to the data bus transmitter 12. The other has adjustable phase in selectable increments for retiming the data bits 31 before storage.

For the preferred embodiment, crystal oscillator 65 provides a 10 MHz clock signal to the fixed phase divide down chain comprising divide-by-10 counter 66, divide-by-100 counter 67, and divide-by-10 counter 68. At the output of divide-by-100 counter 67 a 10 KHz square wave, waveform 110, is directed to one input of NAND gate 70. Divide-by-10 counter 68, connected as a binary coded decimal decade counter, together with NAND gates 69 and 70, generates synchronization signal 30.

The QA output of divide-by-10 counter 68, waveform 111, and the QB output of divide-by-10 counter 68, waveform 112, are combined at NAND gate 69 to decode one count out of 10 cycles of waveform 110. The output of NAND gate 69 goes low during that one count while the output of NAND gate 70 continues to cycle. Waveform 113 represents the output of NAND gate 69, and waveform 114 represents the output of NAND gate 70. Diode 71 turns on during the tenth count. Summation resistor 72 combines the outputs of NAND gates 69 and 70, and is adjusted to give a voltage level midway between the output peaks of NAND gate 70 during the tenth cycle, as represented in waveform 116. For the other nine counts, the output of NAND gate 69 is high, diode 71 is off, and the signal at summation resistor 72 follows the output of NAND gate 70. Waveform 116, available at the adjustment arm of adjustable summation resistor 72, is presented to the input of transmitter 12 for transmission as system synchronization signal 30.

The output of divide-by-10 counter 66, a continuous 1 MHz square wave, is combined with the 10 MHz output of crystal oscillator 65 in the phase selectable sample clock circuit 64.

The phase selectable sample clock circuit 64 can comprise, for instance, a 10-bit serial-in/parallel-out shift register and a one-pole, 10-throw rotary switch. The 1 MHz output of divide-by-10 counter 66 can be input to the register which can be clocked by the 10 MHz output of crystal oscillator 65. Ten different phases of the 1 MHz signal would then be available at the 10 outputs of the serial-in/parallel-out shift register. The one-pole, 10-throw rotary switch could then select one of 10 phases of the 1 MHz signal for clocking the storage circuitry of receiver 13.

The stream of equalized and amplified data pulses 32 from the output of low pass filter 20 is connected to the input of high speed comparator 90. From comparator 90, pulse stream 32 is directed to pulse stretcher 91 which imposes a uniform pulse width upon all incoming data bits 31. Data bits 31, contained in pulse stream 32, are then retimed with D flip flop 92. The phase of the 1 MHz clock available from phase selectable sample clock 64 is adjusted to place the rising edge of the clock in the center of the data pulse output of pulse stretcher 91. The timed data output of D flip flop 92 is connected to the data input of eight serial-in/serial-out shift registers 93. The total storage capacity of each shift register 93 is 100 bits. Placement of data bits 31 into the shift registers 93 is done by appropriate sequential clocking of each register 93 as explained hereinbelow.

Waveform 113 is connected from NAND gate 69, through inverter 63, to the input of variable one-shot 73. The output of variable one-shot 73, represented by waveform 117, is used to align a word frame of synchronization signal 30 with the selected output of phase selectable sample clock 64. The rising edge of waveform 117 is adjusted to rise just prior to the arrival of the first data bit 31 of the current word frame. The output of variable one-shot 73 is synchronized with the 1 MHz clock by D flip flop 74. The Q output of D flip flop 74 goes to the input of D flip flop 76. The $\overline{Q}$ output of D flip flop 76 is combined with the Q output of D flip flop 74 at NAND gate 75 to give a word frame pulse of 1 microsecond width, as shown in waveform 118. This pulse provides the clear for divide-by-100 counter 78 and divide-by-10 counter 77 by loading in all zeroes.

Divide-by-100 counter 78 and divide by 10 counter 77 comprise a divide-by-1000 counter useful for framing input data stream 32 and sequentially clocking data pulses 31 into shift registers 93. The carry output of divide-by-10 counter 77 goes high on the 900th count, representing the first coding period of a cycle of synchronization signal 30, and goes low after the 999th count. The carry output of divide-by-10 counter 77 is shown as waveform 121. Waveform 121 is used for gating the output of phase selectable sample clock 70 to each of the shift registers 93.

The carry signal from divide-by-10 counter 77 is connected to the input of eight-bit, serial-in/parallel-out shift register 80. The carry signal from divide-by-100 counter 78, shown as waveform 120, is connected to the clock input of shift register 80. Outputs $Q_0$, $Q_1$, $Q_2$, and $Q_7$ of shift register 80 are shown, respectively, as waveforms 123, 124, 125 and 126. Each of the eight Q outputs of shift register 80 is connected to one of eight separate NAND gates 82. The 1 MHz output of phase selectable sample clock 64 is inverted through inverter 83 and combined at a NAND gate 82 with a Q output of shift register 80.

Each NAND gate 82 gates a 1 MHz data clock to one shift register 93 contained in receiver storage section 16. Data bits 31 transmitted during a respective coding period will thereby be lodged in a corresponding shift register 93. The MSB data bits 31 arriving during the second coding period of a cycle of synchronization signal 30 will be lodged in storage register 93 served by the $Q_0$ output of shift register 80. During the third coding period of synchronization signal 30, when the $Q_1$ output of shift register 80 is high, the storage register 93 connected to the $Q_1$ output of shift register 80 will store the data bits 31 output by data terminals 14 during the third coding period of synchronization signal 30. In like manner, each storage register 93 will be filled during one coding period until the eighth storage register 93, served by the $Q_7$ output of shift register 80, is filled with the LSB data bits 31 transmitted by data terminals 14 during the ninth coding period of a cycle of synchronization signal 30. Buffer 81 provides an external gating signal, represented by waveform 122, which is the $Q_0$ output of shift register 80. NAND gate 84 provides 100 clock pulses of the 1 MHz data clock available from phase selectable sample clock 70, gated by the $Q_0$ output of shift register 80 during the second coding period of each cycle of synchronization signal 30.

As can be seen by waveforms 123, 124, 125, and 126, data bits 31 from the previous cycle of synchronization signal 30 which are being held in storage registers 93 are clocked out of storage registers 93 during the second coding period when the MSB data bits of the present coding period are being stored. The block diagram of word sampler 9 contained in FIG. 4 teaches a method for extracting and re-assembling the eight data bits 31 transmitted by any data terminal 14 during any particular cycle of synchronization signal 30 during the second coding period of a succeeding cycle.

In the preferred embodiment, word sampler 9 comprises a dual thumbwheel switch 100, on which the number of the data terminal 14 to be sampled can be dialed. Switch 100 is effectively connected to count-down circuit 101 which consists of a presettable divide-by-N counter. N is the number dialed in by switch 100. Countdown is initiated by the rising edge of waveform 122 provided to count-down circuit 101 by buffer 81. Once the count is initiated, the count-down circuit 101 counts the number of gated data pulses available from the output of NAND gate 84. The number appearing on switch 100 is the number of clock pulses prior to activation of digital storage circuit 102. When the desired number is reached, count-down circuit 101 provides an activation signal to data storage circuit 102. Data storage circuit 102 consists of a parallel-in/parallel-out shift register connected on its output side to digital-to-analog converter 103, and, on its input side, to storage registers 93 through the outputs of buffers 94. During the second coding period of any cycle of synchronization signal 30, when data are being clocked out of storage registers 93 through buffers 94, parallel examination of the outputs of storage registers 93 at any given time position will reveal the data word stored in the data terminal 14 whose sequential position corresponds with that particular time position. In this manner, digital storage circuit 102 will store the outputs available through buffers 94 at the time commanded by the count-down circuit 101. Digital-to-analog converter 103 then transforms the stored bits into an electrical current. Operational amplifier 104 converts the current output to a voltage. The voltage output from operational amplifier 104 represents the sampled output of data source 8 connected to data terminal 14 of interest. It is obvious that a number of word samplers 9 connected in parallel can be operated to simultaneously monitor data from a number of different data sources 8. It is also obvious that either the digital output of digital storage circuit 102, or the analog output of operational amplifier 104, can be processed in any manner desired by any appropriate configuration of on-line processing equipment.

Thus, the invention provides an improved method and an apparatus for efficiently multiplexing digital signals derived from a plurality of discrete sources which are interconnected by a single, common conduction path for transmission of those signals. The multiplexed signals are transmitted simultaneously with a system synchronization signal, thus maximizing transmission efficiency upon the common conduction path. Control is vested in a single, simple, system synchronization source which provides both the system synchronization signal and timing and control signals to demultiplex the received multiplexed signal. The apparatus of the invention is readily adaptable to monitor large numbers of signal sources in near real time.

The foregoing description taken together with the appended claims constitutes a disclosure such as to enable a person skilled in the electronics and digital engineering arts and having the benefit of the teachings contained therein to make and use the invention. Further, the method and apparatus herein described meet the aforementioned stated objects of the invention, and generally constitute a meritorious advance in the art unobvious to such a person not having the benefit of these teachings.

Obviously, many modifications and variations are possible in the light of the above teachings, and, it is therefore understood the invention may be practiced otherwise than as specifically described.

What is claimed is:

1. An apparatus for multiplexing digital signals, comprising:

at least one conducting means having two ends and a given length;

means for selectively receiving said digital signals, said receiving means connected to one end of said conducting means;

means for transmitting a synchronization signal comprised of a serial stream of equal coding periods, each of said coding periods consisting of one cycle of a periodic waveform, and each of said periods exceeding in duration the time required for a signal to be propagated through twice said length of said conducting means, said synchronization signal further comprised of an update period wherein said synchronization signal is quiescent, said transmitting means connected to the same end of said conducting means as said receiving means, said transmitting means comprising:

synchronous means connected between said transmitting means and said receiving means for providing said synchronization signal to said transmitting means, and for providing timing and control signals to said receiving means;

an amplifying means responsive to said synchronous means, for amplifying said synchronization signal; and transmitter filter means for reducing interfering harmonics in said synchronization signal, said transmitter filter means connected between the output of said amplifying means and said conducting means; and a plurality of data terminals connected to said conducting means in a spaced sequence, each of said terminals responding to said synchronization signal by transmitting a digital signal upon said conducting means during a coding period, the duration of said digital signal being relatively less than a coding period;

whereby said receiving means detects a serial stream or digital signals during a coding period in a time sequence corresponding to said spaced sequence of said data terminals.

2. An apparatus for multiplexing digital signals, comprising:

at least one conducting means having two ends and a given length;

means for selectively receiving said digital signals, said receiving means connected to one end of said conducting means, said receiving means comprising:

a first amplifying means connected to receive and amplify said digital signals;

equalization means connected to the output of said first amplifying means for reducing spreading of said digital signals;

a second amplifying means connected to said equalization means; and receiver filter means connected to the output of said second amplifying means for limiting the bandwidth of said digital signals; said apparatus further comprising means for transmitting a synchronization signal comprised of a serial stream of equal coding periods, each of said coding periods consisting of one cycle of a periodic waveform, and each of said periods exceeding in duration the time required for a signal to be propagated through twice said length of said conducting means, said synchronization signal further comprised of an update period wherein said synchronization signal is quiescent, said transmitting means connected to the same end of said conducting means as said receiving means;

a plurality of data terminals connected to said conducting means in a spaced sequence, each of said terminals responding to said synchronization signal by transmitting a digital signal upon said conducting means during a coding period, the duration of said digital signal being relatively less than a coding period; and synchronous means connected between said transmitting means and said receiving means for providing said synchronization signal to said transmitting means, and for providing timing and control signals to said receiving means; said receiving means further comprising receiver storage means connected to said receiver filter means and to said synchronous means, and responsive to said synchronous means for timing and storing said digital signals;

whereby said receiving means detects a serial stream of digital signals during a coding period in a time sequence corresponding to said spaced sequence of said data terminals.

3. An apparatus for multiplexing digital signals, comprising:

at least one conducting means having two ends and a given length;

means for selectively receiving said digital signals, said receiving means connected to one end of said conducting means;

means for transmitting a synchronization signal comprised of a serial stream of equal coding periods, each of said coding periods consisting of one cycle of a periodic waveform, and each of said periods exceeding in duration the time required for a signal to be propagated through twice said length of said conducting means, said synchronization signal further comprised of an update period wherein said synchronization signal is quiescent, said transmitting means connected to the same end of said conducting means as said receiving means;

a plurality of data terminals connected to said conducting means in a spaced sequence, each of said terminals responding to said synchronization signal by transmitting a digital signal upon said conducting means during a coding period, the duration of said digital signal being relatively less than a coding period, each of said data terminals comprising:

control means connected to said conducting means and responsive to said synchronization signal for synchronizing the operations of said data terminal;

pulse drive means connected to said control means and to said conducting means for transmitting said digital signals at the command of said control means; and digital storage means connected to said control means and to said pulse drive means for storing digital signals at the command of said control means during said update period, and for providing a digital signal to said pulse drive means at the command of said control means during a coding period; said apparatus further comprising synchronous means connected between said transmitting means and said receiving means for providing said synchronization signal to said transmitting means, and for providing timing and control signals to said receiving means;

whereby said receiving means detects a serial stream of digital signals during a coding period in a time sequence corresponding to said spaced sequence of said data terminals.

4. An apparatus for multiplexing digital signals, comprising:

at least one conducting means having two ends and a given length;

means for selectively receiving said digital signals, said receiving means connected to one end of said conducting means;

means for transmitting a synchronization signal comprised of a serial stream of equal coding periods, each of said coding periods consisting of one cycle of a periodic waveform, and each of said periods exceeding in duration the time required for a signal to be propagated through twice said length of said conducting means, said synchronization signal further comprised of an update period wherein said synchronization signal is quiescent, said transmitting means connected to the same end of said conducting means as said receiving means;

a plurality of data terminals connected to said conducting means in a spaced sequence, each of said terminals responding to said synchronization signal by transmitting a digital signal upon said conducting means during a coding period, the duration of said digital signal being relatively less than a coding period; and synchronous means connected between said transmitting means and said receiving means for providing said synchronization signal to said transmitting means, and for providing timing and control signals to said receiving means, said synchronous means comprising:

clock generating means;

means connected to said clock generating means for generating said synchronization signal, said synchronization signal generating means also connected to said transmitting means;

means connected to said clock generating means for generating timing and control signals for said receiving means, and coupling means for connecting said transmitting means and said receiving means to said conducting means;

wherein said coupling means prevents said synchronization signal from entering said receiving means;

whereby said receiving means detects a serial stream of digital signals during a coding period in a time sequence corresponding to said spaced sequence of said data terminals, said transmitting means comprising:

first amplifying means responsive to said synchronous means, for amplifying said synchronization signal; and transmitter filter means for reducing interfering harmonics in said synchronization signal, said transmitter filter means connected between the output of said first amplifying means and said coupling means.

5. The apparatus of claim 4 wherein said receiving means comprises:

second amplifying means connected to said coupling means for receiving and amplifying said digital signals;

equalization means connected to the output of said second amplifying means for reducing spreading of said digital signals;

third amplifying means connected to said equalization means;

receiver filter means connected to the output of said third amplifying means for limiting the bandwidth of said digital signals; and receiver storage means connected to said receiver filter means and to said synchronous means, and responsive to said synchronous means for timing and storing said digital signals.

6. The apparatus of claim 5 wherein each of said data terminals comprises:

control means connected to said conducting means and responsive to said synchronization signal for synchronizing the operations of said data terminal;

pulse drive means connected to said control means and to said conducting means for transmitting said digital signals at the command of said control means; and digital storage means connected to said control means and to said pulse drive means for storing digital signals at the command of said control means during said update period, and for providing a digital signal to said pulse drive means at the command of said control means during a coding period.

7. The apparatus of claim 6 wherein each of said data terminals further comprises:

power means connected to said conducting means and responsive to a bipolar synchronization signal for deriving power therefrom.

8. The apparatus of claim 7 wherein each of said data terminals further comprises:

means connected to said digital storage means and to said control means for converting analog signals to digital signals at the command of said control means;

analog means connected to said converting means and to said control means for sampling analog signals at the command of said control means;

means connected to said analog sampling means for amplifying an analog signal from a source external to said data terminal; and gating means connected between said data terminal power means and said converting means, and connected to said control means for providing power to said converting means upon command of said control means.

9. The apparatus of claim 8 further including word sampling means for recreating said analog signals which have been digitally converted in said data terminals, said word sampling means comprising:

means for sampling the contents of said receiver storage means by simultaneously strobing the outputs of said receiver storage means; and means for converting said sampled outputs into analog signals.

* * * * *